Figure 1:
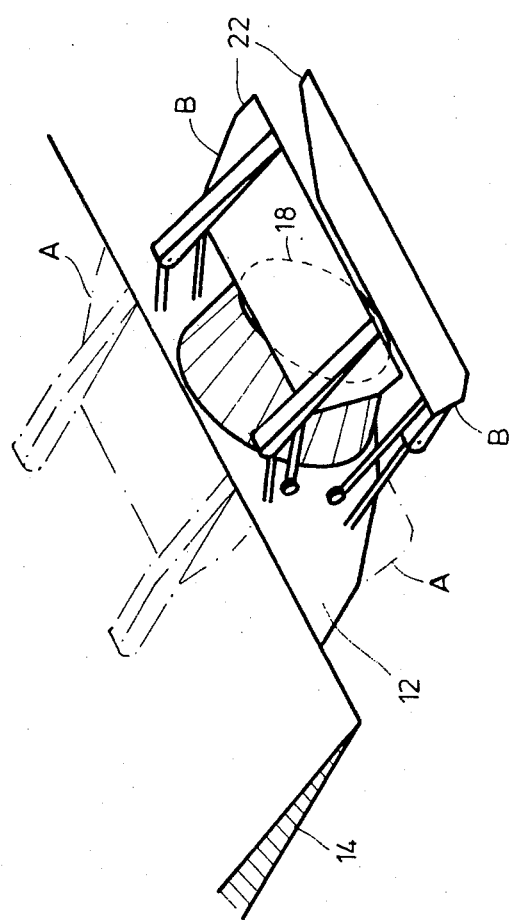

United States Patent
Ffowces-Williams et al.

[15] 3,706,353
[45] Dec. 19, 1972

[54] NOISE SUPPRESSOR FOR JET ENGINES

[72] Inventors: John Eirwyn Ffowces-Williams, Surrey; Roy Hawkins, Bristol; Hylton Dawson, Bristol; William Smith, Bristol, all of England

[73] Assignee: Secretary of State for Defense in Her Brittanic Majesty's Government of the United Kingdom of Great Britain and Northern Ireland, London, England

[22] Filed: Nov. 23, 1971

[21] Appl. No.: 201,511

[30] Foreign Application Priority Data

Nov. 30, 1970 Great Britain.....................56,887/70
Dec. 19, 1970 Great Britain.....................60,404/70

[52] U.S. Cl.........181/33 HC, 181/33 HD, 181/64 A, 181/51
[51] Int. Cl..........F01n 1/14, F01n 1/16, B64d 33/06
[58] Field of Search..................181/33 H, 33 HB, 33 HC, 33HD, 181/43, 51, 64 R, 64 A, 64 B, 65; 239/265.13, 265.33, 265.35, 265.37, 265.39,

[56] References Cited

UNITED STATES PATENTS

| 2,486,967 | 11/1949 | Morrisson.......................181/33 HD |
| 2,928,238 | 3/1960 | Hawkins.........................181/33 HD |

FOREIGN PATENTS OR APPLICATIONS

| 580,995 | 9/1946 | Great Britain..................239/265.37 |
| 874,427 | 8/1961 | Great Britain..................239/265.37 |

Primary Examiner—Robert S. Ward, Jr.
Attorney—Richard K. Stevens et al.

[57] ABSTRACT

The disclosure of this invention pertains to noise suppression apparatus for jet engines wherein two convergent but otherwise relatively flat plates are arranged in a position downstream of the exhaust nozzle of an engine and at opposite sides of the nozzle axis so that a generally axisymmetric jet is flattened when passing through between the plates and is thereby caused to spread in a direction transverse to said axis with consequent noise suppression in said direction.

3 Claims, 4 Drawing Figures

NOISE SUPPRESSOR FOR JET ENGINES

This invention relates to noise suppressors for jet engines and is concerned with the suppression of jet noise.

It is an object of this invention to provide an improved means for suppressing jet noise in a selected axis plane of the nozzle generating the jet.

According to this invention there is provided jet propulsion apparatus for aircraft comprising a jet nozzle defining an axisymmetric discharge opening for combustion products, two members having an operative position downstream of the discharge opening and in spaced apart relationship at opposite sides of the nozzle axis such that two surfaces defined by the respective members are generally parallel in a direction transverse to the nozzle axis but are convergent towards their downstream ends and in the direction of said axis; the members being positioned so as to be spaced apart at their upstream ends by an amount greater than, and at their downstream ends by an amount less than the diameter of said opening; whereby, in operation, the jet flow from the nozzle is spread to either side of the nozzle axis in the direction in which the surfaces are generally parallel.

The spreading of the jet in this way results in noise suppression in the nozzle axis plane including the direction in which the jet is spread in preference to nozzle axis planes having a different angular orientation about the nozzle axis.

Figure 2:
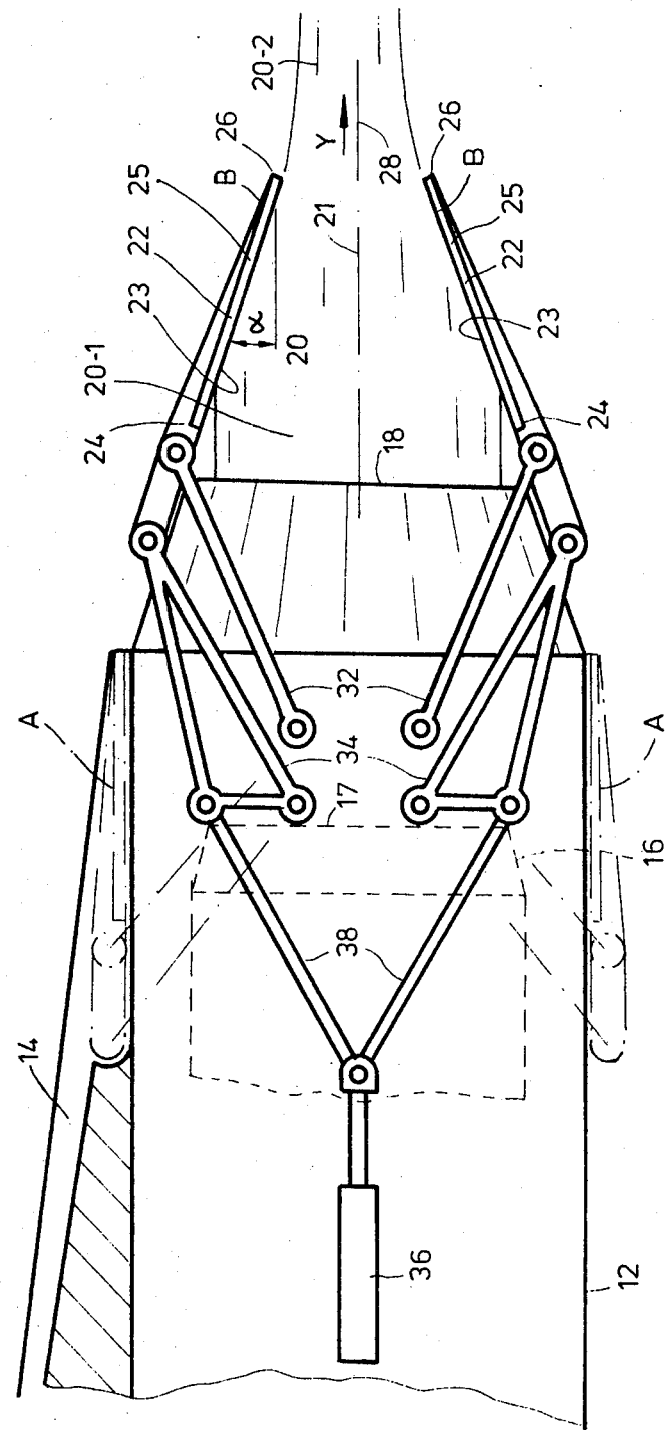
Figure 3:
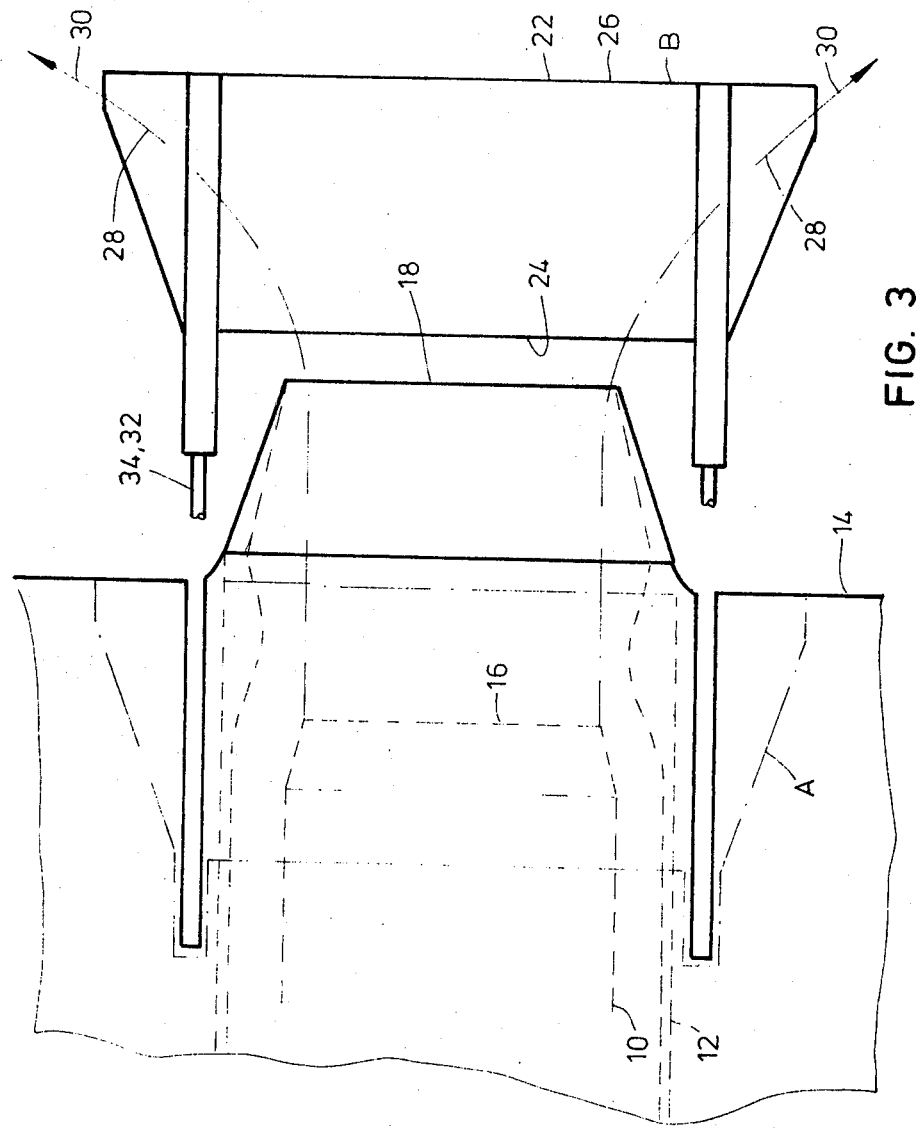
Figure 4:
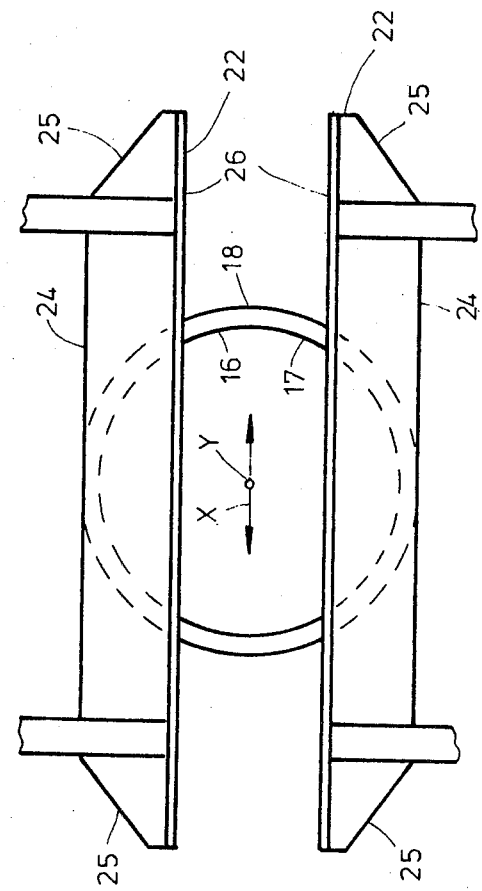

An example of apparatus according to this invention will now be described with reference to the accompanying drawings wherein:

FIG. 1 is a perspective view of the powerplant.
FIG. 2 is a side view of the powerplant.
FIG. 3 is a plan view of FIG. 1.
FIG. 4 is an end view of FIG. 2.

Referring to the drawings, a gas turbine engine 10 is supported within a nacelle 12 connected to a wing 14 of an aircraft. The engine exhausts through a primary nozzle 16 and a secondary nozzle 18.

The nozzle 16 is axisymmetric, e.g. circular, with respect to a nozzle axis 21. The nozzle has a circular outlet opening 17.

Downstream of the opening 17 there are provided two members or plates 22 arranged in an operative position B (FIG. 2) in spaced apart relationship at opposite sides of the axis 21. The plates 22 define surfaces 23 which are generally parallel in a direction X (FIG. 4) transverse to the axis 21 but which are convergent in the direction Y (FIG. 2) being the direction of flow along the axis 21.

The upstream and downstream ends of the surfaces 23 are defined by edges 24, and 26, respectively, and the lateral width of the surfaces 23 is defined by edges 25 of the plates 22. In the illustrated example the edges 24, 26 of each plate are straight and the edges 24, 26 of the one plate are parallel to the corresponding edges of the other plate.

The edges 24, 26 may be curved either in the concave or the convex relation to the axis 21 but the edges 24, 26 of the one plate must be generally parallel to those of the other plate in the sense of, for example, the straight line defining the mean of one curved edge 24 being parallel to the corresponding line of the other edge 24. The curving may be made for aerodynamic reasons or for facilitating the stowing of the plates in inoperative positions clear of the flow of the jet.

The convergence of the surface 23 is such that while the edges 24 of the respective plates are spaced apart by a distance greater than the diameter of a cross section 20–1 of the jet, being the diameter of unrestricted flow from the opening 17, the spacing of the edges 26 is substantially less than said diameter so that in the direction Y in which the surfaces are convergent the jet is deformed from the cross-section 20–1 into a relatively flat cross-section 20–2. This flattening causes the jet to spread in the direction X as shown by lines 28 (FIG. 3) and the effect of the surfaces 23 on the jet is such that after emerging from between these surfaces the jet continues to spread as indicated by arrows 30 (FIG. 3). In accordance with the geometry of the spreading jet the surfaces 23 are wider at their downstream ends than at their upstream ends, i.e. the edges 26 are longer than the edges 24, and the latter edges need not be significantly longer than the diameter of the jet at the cross-section 20–1. The spread jet manifests noise suppression in a plane including the directions X, Y in preference to nozzle axis planes having a different angular orientation about the axis 21. For the purposes of this invention the diameter of the jet may be regarded as substantially the same as that of the opening 17. Therefore the spacing of the edges 24 may be said to be greater than, and that of the edges 26 to be less than the diameter of the opening 17.

It will be clear that an angle $\alpha$ (FIG. 2) between the surfaces 23 and the axis 21 must be relatively small so as to avoid unduly high thrust losses and achieve good flow. Generally, the angle $\alpha$ should not be above 30° and is preferably in the order of 20°. The spacing of the edges 26 should not be above half the diameter of the opening 17 in order to achieve significant noise attenuation, say 5 to 10 PNdB.

The axial distance between the edges 26 and the outlet 17 may be as small as is practicable having regard to the lay-out of the plant as a whole.

The space between the surfaces 23 is open to ambient atmosphere not only in the plane between the edges 26 but also laterally in the two planes between the edges 25 of the respective plates. This is important for allowing free spreading of the jet and the space between the surfaces 23 should be open laterally at least at a part of the edges 25 adjacent the edges 26.

The plates 22 are supported by links 32, 34 for movement between the operative position B and an inoperative or stowed position A clear of the jet 20. The movement is produced by fluid pressure motors 36 (only one shown; FIG. 2) acting through rods 38. In position A the plates are situated respectively above and below the nacelle 12 but any other position may be selected for stowing having regard to the lay-out of the plant.

What I claim is:

1. Jet propulsion apparatus for aircraft comprising a jet nozzle defining an axisymmetric discharge opening for combustion products, two members having an operative position downstream of the discharge opening and in spaced apart relationship at opposite sides of the nozzle axis such that two surfaces defined by the respective members are generally parallel in a direction transverse to the nozzle axis but are convergent towards their downstream ends and in the direction of said axis; the members being positioned so as to be spaced apart at their upstream ends by an amount greater than, and at their downstream ends by an amount less than the diameter of said opening; whereby in operation the jet flow from the nozzle is spread to either side of the nozzle axis in the direction in which the surfaces are generally parallel.

2. Apparatus according to claim 1, wherein said members each having a downstream edge defining the downstream end of the surface related to the member and lateral edges defining the width of the surface, and wherein the members are related for the space between the surfaces to be open to atmosphere at the downstream edges and at least at a part of the lateral edges adjacent the downstream edges.

3. Apparatus according to claim 1 wherein the members are supported for movement relative to the nozzle between said operative position and an inoperative position in which the surfaces are spaced apart so as to be clear of the axial projection of the nozzle discharge opening thereby to be clear of the jet flow therefrom.

* * * * *